(Model.)

J. H. MITCHELL.
DRIVE CHAIN.

No. 526,161.

Patented Sept. 18, 1894.

2 Sheets—Sheet 1.

WITNESSES:
Wm. H. Weightman
Isabel Chester

INVENTOR
James H. Mitchell,
BY
A. M. Pierce
ATTORNEY.

(Model.)
J. H. MITCHELL.
DRIVE CHAIN.
No. 526,161.   Patented Sept. 18, 1894.
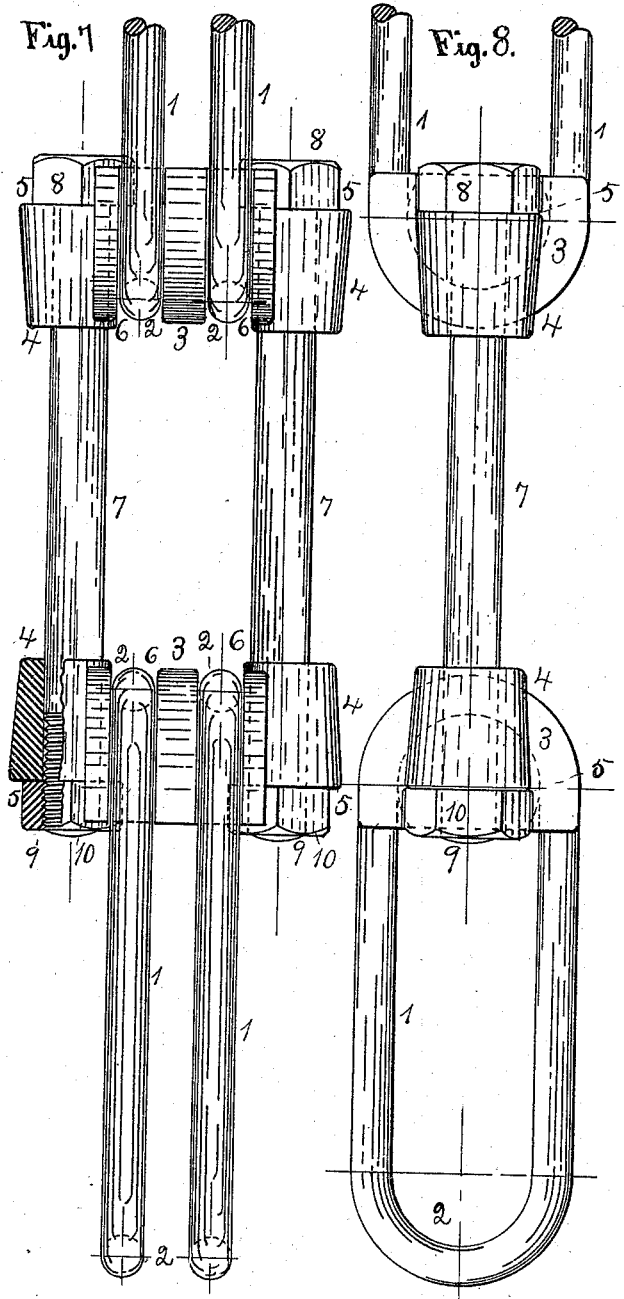
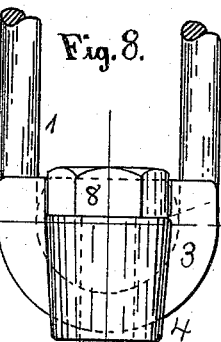
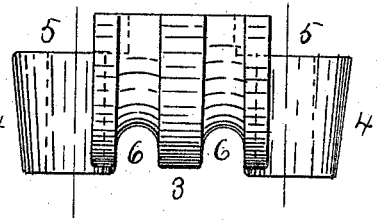
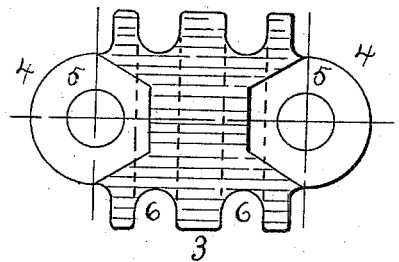
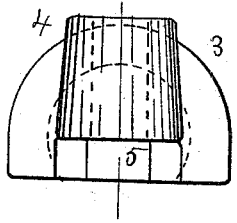
WITNESSES:
INVENTOR
James H. Mitchell
BY A. M. Pierce,
ATTORNEY.

UNITED STATES PATENT OFFICE.

JAMES H. MITCHELL, OF PHILADELPHIA, PENNSYLVANIA.

DRIVE-CHAIN.

SPECIFICATION forming part of Letters Patent No. 526,161, dated September 18, 1894.

Application filed May 18, 1893. Serial No. 474,646. (Model.)

*To all whom it may concern:*

Be it known that I, JAMES H. MITCHELL, a citizen of the United States, residing in Philadelphia, county of Philadelphia, State of Pennsylvania, have invented a new and useful Improvement in Drive-Chains, of which the following is a specification.

My invention relates especially to chains designed for transmitting motion to sprocket wheels for driving machinery, and has for its object the provision of a simple, strong and effective chain, the links whereof may be easily detached from each other, and independently adjusted for taking up elongation and wear, thus accurately accommodating the chain to the sprockets wherewith it engages.

To attain the desired end, my invention involves certain novel and useful combinations or arrangements of parts, and peculiarities of construction, all of which will be hereinafter first fully described, and then pointed out in the claims.

Figure 1:
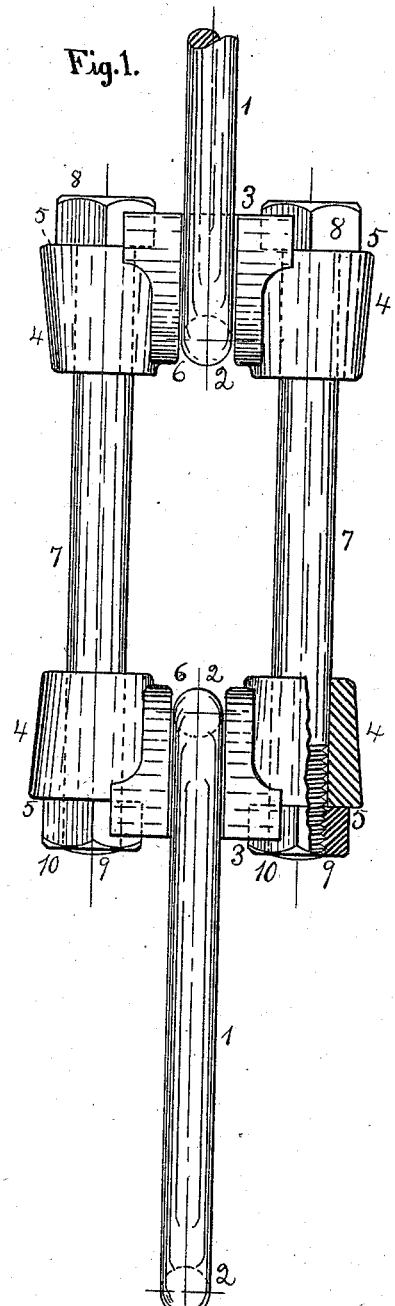
Figure 2:
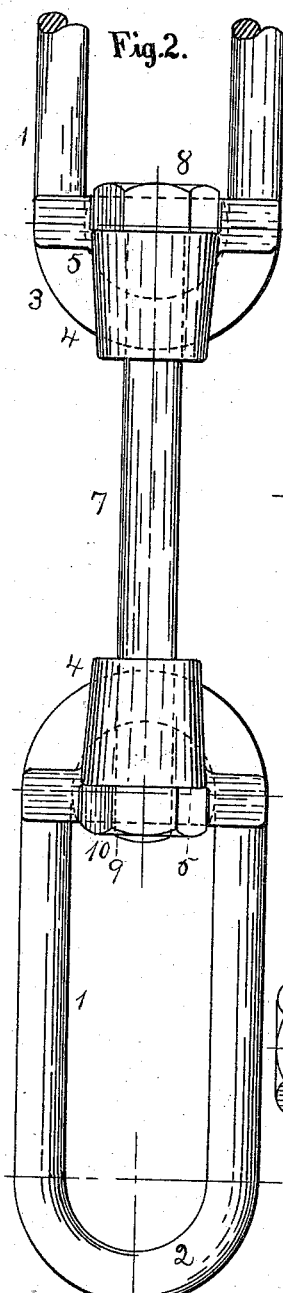
Figure 3:
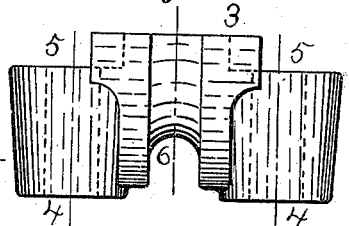
Figure 4:
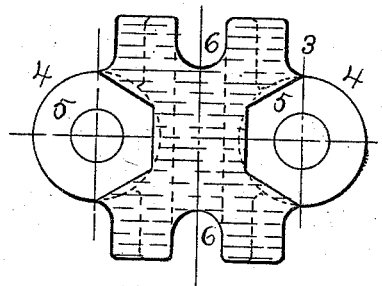
Figure 5:
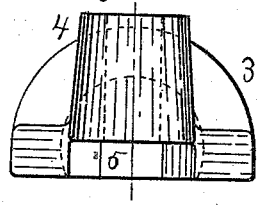
Figure 6:
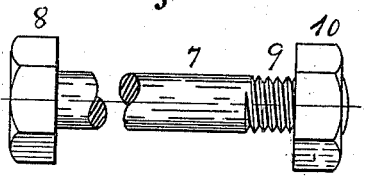

In the accompanying drawings, Figure 1 is a plan view of a portion of a chain constructed in accordance with my invention, and Fig. 2 is a side view thereof. Fig. 3 is a view of one of the rectangular link cross-bars, detached. Fig. 4 is an end view of said cross-bar, looking from the top of Fig. 3. Fig. 5 is a side view of said cross-bar. Fig. 6 is a view of one of the bolts forming the rectangular link, detached therefrom. Fig. 7 is a plan view of a modified form of my drive chain, showing two connecting links employed instead of one. Fig. 8 is a side elevation of the chain illustrated in Fig. 7. Fig. 9 is a plan view of the cross-bar employed in said chain, detached therefrom. Fig. 10 is an end view of said cross-bar, looking from the top of Fig. 9, and Fig. 11 is a side elevation thereof.

Similar numerals of reference, wherever they occur, indicate corresponding parts in all the figures.

1 is a link, forged of round iron, and having its ends 2, semicircular.

3 is a cross-bar preferably cast. At each side of this cross-bar are perforated ears 4, having depressions 5 in their outer faces. At the center of each cross-bar 3, is a semicircular groove 6, adapted and arranged to receive the end 2 of a link 1. In the construction shown in Figs. 7, 8, 9, 10 and 11, I have shown two such grooves 6, and two links 1, the object of this construction being to increase the strength of the chain.

7 are bolts, having hexagonal heads 8, at one extremity, and screw-threads 9 at the other, arranged to engage with a nut 10.

Heretofore in drive chains of the character to which my invention relates, no provision was made for taking up the wear, or tightening the chain when the links became elongated from any cause, and for positively locking or holding the parts in the positions to which they have been adjusted for taking up such wear, or for other purposes, and hence the links would not register with the teeth of the sprocket wheel, thereby causing great inconvenience, and frequently rendering the chain inoperative. As it is impossible to prevent wear and stretching, I have devised and provided means whereby in my chain every alternate link can be shortened to take up this wear as fast as it occurs through use or strain.

Another object of my invention is to render the chain detachable at any point, and to so construct the chain that this detachment cannot take place while the chain is taut, the tightening of the chain insuring a locking of the detaching parts. In my chain a free oscillation is permitted of the links in one direction, whereby the chain is permitted to encircle sprocket wheels of different diameters, or be turned in a reverse position.

The invention further consists in the use of an ordinary forged link, made of round iron and having rounded or semicircular ends, in combination with a rectangular link composed of two screw-threaded bolts and two cross-bars, as hereinabove described. The cross-bars are so shaped and arranged as to conform to the rounded ends of the forged links, thereby forming a bearing which guides and permits the forged link to oscillate freely upon the cross-bar, at right angles thereto. These cross-bars are so shaped at their ends, as to form holding cavities which embrace the heads 8, and nuts 10 of the adjustable bolts, keeping the bolts parallel with each other. The separation farther apart, or drawing the cross-bars toward each other is accomplished by lengthening or shortening the space between said heads and nuts, and the nuts can only be turned by sliding the cross-bars toward each other a sufficient distance to release the nuts from engagement with the holding cavity in the cross head. In this position, any desired adjustment may be given, or an entire separation of the link and chain may be accomplished by simply removing the nuts from the bolts. When the chain is made taut, the heads 8 and nuts 10 will again enter the cavities in the cross-bars, thus preventing any rotation of either the bolts or nuts positively locking the adjusted links to any desired position.

In placing the forged links around the cross-bars which form the ends of the rectangular adjustable links, the cross-bar is entered between the two sides of the link and then turned one-quarter of a revolution. When in this position, the two adjusting bolts forming the sides of the rectangular links are passed through the ears 4, and another cross-bar, encircled by another forged link is passed over the two adjusting bolts and the nuts 10, screwed into position. In this way the chain is built up, every alternate link being a forged one, between which forged links are arranged the built-up sprocket engaging links. It will be observed that the space inclosed by each sprocket link is such as to properly fit the sprocket, as the grooves 6 in the cross bars of these links not only serve to hold the forged links in proper position, but they also permit the proper and necessary connection and articulation of the two sets of links without encroaching upon the rectangular opening formed by the cross bars and the connecting bolts of the built-up links.

Having now fully described my invention, what I claim as new therein, and desire to secure by Letters Patent, is—

1. A drive-chain comprising alternately forged links and built-up links, the latter composed each of two end cross-bars, and two, headed screw-threaded bolts and nuts thereon, the cross-bars being shaped to prevent the turning of the bolts and nuts relative to each other when the chain is in use, substantially as set forth.

2. A chain link consisting of two cross-bars, and two screw bolts having their respective heads and nuts encircled and locked by depressions in the cross-bars, substantially as shown and described.

3. A drive-chain composed of alternately arranged forged links with rounded ends, and adjustable built-up links having cross-bars with recesses 6 in which lie the rounded ends of the forged links, whereby they are held at right angles to the built-up links, and the side screw-threaded bolts with nuts and heads held against turning by engagement with the cross-bars, substantially as set forth.

JAMES H. MITCHELL.

Witnesses:
A. M. PIERCE,
ISABEL CHESTER.